US006414722B1

(12) United States Patent
Bramley

(10) Patent No.: US 6,414,722 B1
(45) Date of Patent: Jul. 2, 2002

(54) PROCESS AND SYSTEM FOR FORMULATING DIGITAL IMAGES RESULTING FROM AUXILIARY GRAPHICAL ELEMENTS INLAID INTO MAIN IMAGES

(75) Inventor: Richard Bramley, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/352,512

(22) Filed: Jul. 12, 1999

(30) Foreign Application Priority Data

Jul. 17, 1998 (FR) ........................................ 98 09158

(51) Int. Cl.[7] ........................ H04N 5/45; H04N 5/445

(52) U.S. Cl. ..................... 348/565; 348/566; 348/568; 348/589; 348/600

(58) Field of Search .............................. 348/563, 564, 348/565, 566, 567, 568, 584, 588, 589, 598, 600, 599; H04N 5/45, 5/445, 9/74, 9/76

(56) References Cited

U.S. PATENT DOCUMENTS 5,361,098 A * 11/1994 Lucas ........................ 348/565
5,907,369 A * 5/1999 Rumreich .................. 348/566
5,963,270 A * 10/1999 Hwang ...................... 348/588
5,982,453 A * 11/1999 Willis ........................ 348/565
6,144,415 A * 11/2000 Patton ....................... 348/565

FOREIGN PATENT DOCUMENTS

EP 0798722 A2 10/1997 ........... G11B/2/71
EP 0838948 A1 4/1998 ........... H04N/5/92
EP 0853430 A 7/1998 ........... H04N/5/92

* cited by examiner

*Primary Examiner*—Sherrie Hsia
(74) *Attorney, Agent, or Firm*—Lisa K. Jorgenson; Allen, Dyer, Doppelt, Milbrath & Gilchrist, P.A.

(57) ABSTRACT

The compressed data of an auxiliary stream of data, defining an auxiliary image, is decoded on the fly during the display of each main image into which this auxiliary image is to be inset. The data is decoded to deliver luminance and chrominance values intended to be mixed with the luminance and chrominance values of the counterpart pixels of the main image being displayed, in succession during each decoding of the auxiliary image and for the successive pixels of this auxiliary image.

27 Claims, 6 Drawing Sheets

| | LUT1 |
|---|---|
| 00 | B ; 20% |
| 01 | G ; 20% |
| 10 | Y 80% |
| 11 | R ; 50% |

LUT1

| | LUT2 |
|---|---|
| 00 | O ; 20% |
| 01 | G ; 20% |
| 10 | |
| 11 | |

LUT2

PROCESS AND SYSTEM FOR FORMULATING DIGITAL IMAGES RESULTING FROM AUXILIARY GRAPHICAL ELEMENTS INLAID INTO MAIN IMAGES

FIELD OF THE INVENTION

The invention relates to the formation of digital images from auxiliary graphical elements which form auxiliary graphical images or sub-images ("sub-pictures"). In particular, the invention relates to the decoding of these sub-images which are intended to be inset into a predetermined area of a display screen and superimposed on main images.

BACKGROUND OF THE INVENTION

Images to be decoded, for example, according to the MPEG standards ("Motion Pictures Experts Group") are stored as compressed data on, for example, a multifunction digital disc (DVD: "Digital Versatile Disk"). Furthermore, auxiliary images or sub-images which result from auxiliary data or sub-image data (sub-picture data) are stored in a compressed manner on a such a disk.

One of the uses of these auxiliary graphical images or sub-images relates to the display of menus on the screen of a television. Also, these images can be used to inset small moving sequences on the main images depicted on the screen of a television set. Additionally, these images can be used for the depicting of texts of songs in karaoke applications.

A current method used for forming auxiliary graphical images includes decoding the auxiliary graphical data, compressed and stored on the digital disk, with software to store the decoded auxiliary graphical images in a dynamic memory. In this way, the auxiliary graphical images are ready to be extracted from the memory, as many times as necessary, to be displayed each time pixel by pixel. However, such a method requires a substantial memory size, especially when the size of the auxiliary graphical images is substantial.

SUMMARY OF THE INVENTION

An object of this invention is to solve this problem by proposing an approach for the decoding and forming of these auxiliary graphical images, and for the forming of the images resulting from being superimposed on the stream of main images. The invention therefore proposes a process for forming digital images resulting from auxiliary graphical elements inset on the main images.

Generally, the invention includes a process which comprises the receipt of at least one auxiliary stream comprising a set of compressed graphical data corresponding to graphical elements forming at least one auxiliary graphical image intended to be inset into a predetermined area on a display screen. The auxiliary graphical image, superimposed on a main image, is displayed at the occurrence of a predetermined initial main image and for a predetermined elementary duration. Furthermore, the process comprises the storage of the auxiliary stream in a memory, and successive decodings of the compressed graphical data. These successive decodings are respectively performed during the display of the successive main images from the display of the initial main image up to the expiration of the predetermined elementary duration. Also, these successive decodings are performed to deliver in the course of each decoding, at the rate of display of the pixels on the screen and for each pixel of the auxiliary image, luminance and chrominance values as well as a mixing coefficient. The process also comprises the pixel-by-pixel mixing, in the predetermined screen area, of the chrominance and luminance values corresponding to the current main image being displayed and to the decoded auxiliary graphical image, having the mixing coefficients.

In other words, the process according to the invention provides for an on the fly decoding of the compressed graphical data of a graphical image, during the display of a main image (in practice and for example, during the display of each frame of the main image). Furthermore, the process provides for the redecoding of the same data corresponding to the same graphical image for each main image, i.e. in the course of the display of each main image, and for as long as necessary. Thus, for example, if an auxiliary graphical image needs to be inset on the display screen superimposed on an initial main image and superimposed on the next 99 main images, the compressed graphical data corresponding to each frame of this auxiliary image will be decoded 100 times in succession. Each decoding taking place in real time during the display of the current main image so that the mixer receives in a synchronized manner, for each pixel, the luminance and chrominance values of the main image intended to be displayed. And, the mixer receives the luminance and chrominance values of the decoded auxiliary graphical image likewise intended to be displayed and superimposed on this main image being displayed.

The invention therefore has the notable advantage of reducing the necessary memory size as well as the memory passband used because the auxiliary graphical data of each graphical image may be kept in the memory in a compressed form. The decoding of this data does not require storage of the decoded auxiliary graphical image in the memory before its display.

The auxiliary stream generally comprises a header, the compressed graphical data, and at least one set of parametrization data, making it possible to parametrize the decoding of the graphical image. Moreover, according to one embodiment of the invention in which the main images are displayed line by line in two successive frames corresponding to lines of different parities, a process is performed for analyzing the parametrization data between each display of a frame. This being so, it would also be possible in another embodiment of the invention, to perform this process for analyzing the parametrization data during each line flyback. In fact, generally, the process for analyzing the parametrization data is performed during a period when there is no pixel display on the screen, so as not to disturb this display.

The set of compressed graphical data can correspond to several successive auxiliary graphical images each intended to be superimposed in succession with the main images for a respective elementary duration. The auxiliary stream thus comprises several sets of parametrization data each making it possible to parametrize the decoding of an auxiliary graphical image. And, so long as the elementary duration corresponding to an auxiliary graphical image has not elapsed, the set of parametrization data corresponding to this image is analyzed between each display of a frame. Then the compressed graphical data of this image is decoded on the basis of the parametrization data. And, when the corresponding elementary duration has elapsed, there is an automatic transfer to the analysis of the set of parametrization data corresponding to the next auxiliary graphical image. Then compressed graphical data of this next image is decoded on the basis of these new parametrization data.

According to a particular embodiment of the invention, on receiving the auxiliary stream, a temporal counter is initialized to a predetermined initial value (for example the time of display of the first auxiliary graphical image). Each set of parametrization data comprises a temporal indication, linked to the predetermined initial value (for example the start time of display of each of these auxiliary graphical images), and representative of the start instant of the first decoding of the corresponding auxiliary graphical image. Before commencing the decoding of the compressed data corresponding to the first auxiliary graphical image, the temporal indication of the next auxiliary graphical image is stored in a register and the successive decodings of the auxiliary graphical image are performed. These decodings are parametrized by the corresponding set of parametrization data so long as the value of the counter is less than the content of the register. And, when the value of the counter becomes greater than or equal to the content of the register, then it is time to carry out the decoding and displaying of the next auxiliary graphical image.

According to one embodiment of the invention, the processing for analyzing a set of parametrization data comprises the storing of different groups of color/mixing coefficient pairs in different respective elementary memories (look-up tables). The number of pairs per group is less than a first predetermined number (for example four when the tables are addressed by 2 bits). Furthermore, the number of groups is less than or equal to a second predetermined number (for example eight, corresponding to a maximum of eight different regions per image line). The line-by-line decoding of each auxiliary graphical image thus comprises successive addressing by the decoded graphical data, of the various elementary memories designated in succession by designation data contained in the set of parametrization data.

In other words, by way of example, once several look-up tables have been programmed during the process for analyzing the parametrization data, a first look-up table is addressed in respect of the first pixels of the line. Then, as a function of a designation datum corresponding to the size of the region (for example, the number of pixels), there is a switch, after formulating this number of pixels, over to another look-up table which will be addressed on the basis of the next decoded graphical data, and so on and so forth.

The subject of the invention is also a system for forming digital images resulting from auxiliary graphical elements inset on main images. According to a general characteristic of the invention, this image forming system comprises a receiver for receiving a main stream comprising main digital image compressed data, and at least one auxiliary stream comprising a set of compressed graphical data corresponding to graphical elements forming at least one graphical image. Such a graphical image intended to be inset into a predetermined area of a display screen, from the occurrence of an initial main image and for a predetermined elementary duration, and superimposed on the main images. The system also includes a memory for storing the main stream and the auxiliary stream, and a main decoder (for example an MPEG decoder if the main images are compressed according to an MPEG standard). This main decoder being able to decode the main stream of compressed data and to deliver for each pixel of a decoded main image, luminance and chrominance values.

Furthermore, the system also comprises a device for forming the resulting images comprising a decoder (e.g. an auxiliary decoder, sub-image decoder or sub-picture decoder) able to perform successive decodings of the compressed graphical data contained in the memory. These successive decodings are performed respectively during the display of the successive main images, from the display of the initial main image up to the expiration of the predetermined elementary duration. These successive decodings are performed to deliver in the course of each decoding, at the rate of display of the pixels on the screen and for each pixel of the auxiliary image, luminance and chrominance values as well as a mixing coefficient. The image forming device further comprises a mixer able to perform the pixel-by-pixel mixing in the predetermined screen area of the chrominance and luminance values corresponding to the current main image and to the decoded auxiliary graphical image, with respect to the mixing coefficients.

According to one embodiment of the invention, in which the auxiliary stream comprises a header, the compressed graphical data, and at least one set of parametrization data making it possible to parametrize the decoding of the graphical image, the auxiliary decoder (sub-image decoder) comprises a first FIFO type memory (first in-first out) able to store the compressed graphical data, and a second FIFO type memory able to store the parametrization data. Moreover, the main images are displayed line by line and in two successive frames corresponding to lines of different parities. The auxiliary decoder comprises an analyzer able, between each displaying of a frame, to deliver the parametrization data to the second memory and to perform a process for analyzing these parametrization data. The auxiliary decoder also comprises a processor (comprising for example a variable-length decoder (VLD) and a zero-run decoder (RLD)) able to decode the compressed graphical data stored in the first memory, on the basis of the parametrization data. And, the processor is able to deliver to the mixer, for each pixel of the auxiliary graphical image, the luminance and chrominance values, as well as a mixing coefficient.

When the set of compressed graphical data corresponds to several successive auxiliary graphical images intended to be superimposed in succession on the main images for a respective elementary duration, the auxiliary stream comprises several sets of parametrization data each making it possible to parametrize the decoding of an auxiliary graphical image. And, so long as the elementary duration corresponding to an auxiliary graphical image has not elapsed, the analyzer delivers to the second memory, between each displaying of a frame, the corresponding parametrization data and performs a process for analyzing these parametrization data. The processor decodes the compressed graphical data stored in the first memory, on the basis of the parametrization data, and when the corresponding elementary duration has elapsed, the analyzer delivers to the second memory, between each displaying of a frame, the parametrization data of the next auxiliary graphical image and performs a process for analyzing these new parametrization data. The processor then decodes the compressed graphical data stored in the first memory and corresponding to this next auxiliary graphical image, on the basis of these new parametrization data.

According to one embodiment of the invention, the analyzer comprises a temporal counter and controller able to initialize the temporal counter to a predetermined initial value. Each parametrization datum comprises a temporal indication, linked to the predetermined initial value, and representative of the start instant of the first decoding of the corresponding auxiliary graphical image. The analyzer is thus able to store, in a register, the temporal indication of the next auxiliary graphical image. The processor performs the successive decodings of the current auxiliary graphical images, these decodings being parametrized by the corresponding set of parametrization data so long as the value of the counter is less than the content of the register.

According to one embodiment of the invention, the auxiliary decoder (sub-image decoder) comprises elementary memories (look-up tables). The analyzer is able to store respectively in at least some of these elementary memories, different groups of color/mixing coefficient pairs. The number of pairs per group is less than a first predetermined number, while the number of elementary memories is less than or equal to a second predetermined number (for example 8). The processor comprises an auxiliary decoder block (VLD circuit and RLD circuit) able to decode the compressed graphical data and to address the elementary memories with the decoded graphical data, as well as a multiplexer whose inputs are linked to the outputs of the elementary memories. The auxiliary decoder also comprises a controller of the multiplexer which is able to select the inputs of the multiplexer as a function of designation data contained in the parametrization data, these designation data making it possible to select one of the elementary memories (look-up table).

BRIEF DESCRIPTION OF THE DRAWINGS

Other advantages and characteristics of the invention will become apparent from an examination of the detailed description of embodiments and modes of implementation, which are in no way limiting, and of the appended drawings, in which.

DETAILED DESCRIPTION OF THE PREFERRED EMBODIMENTS

Figure 1:
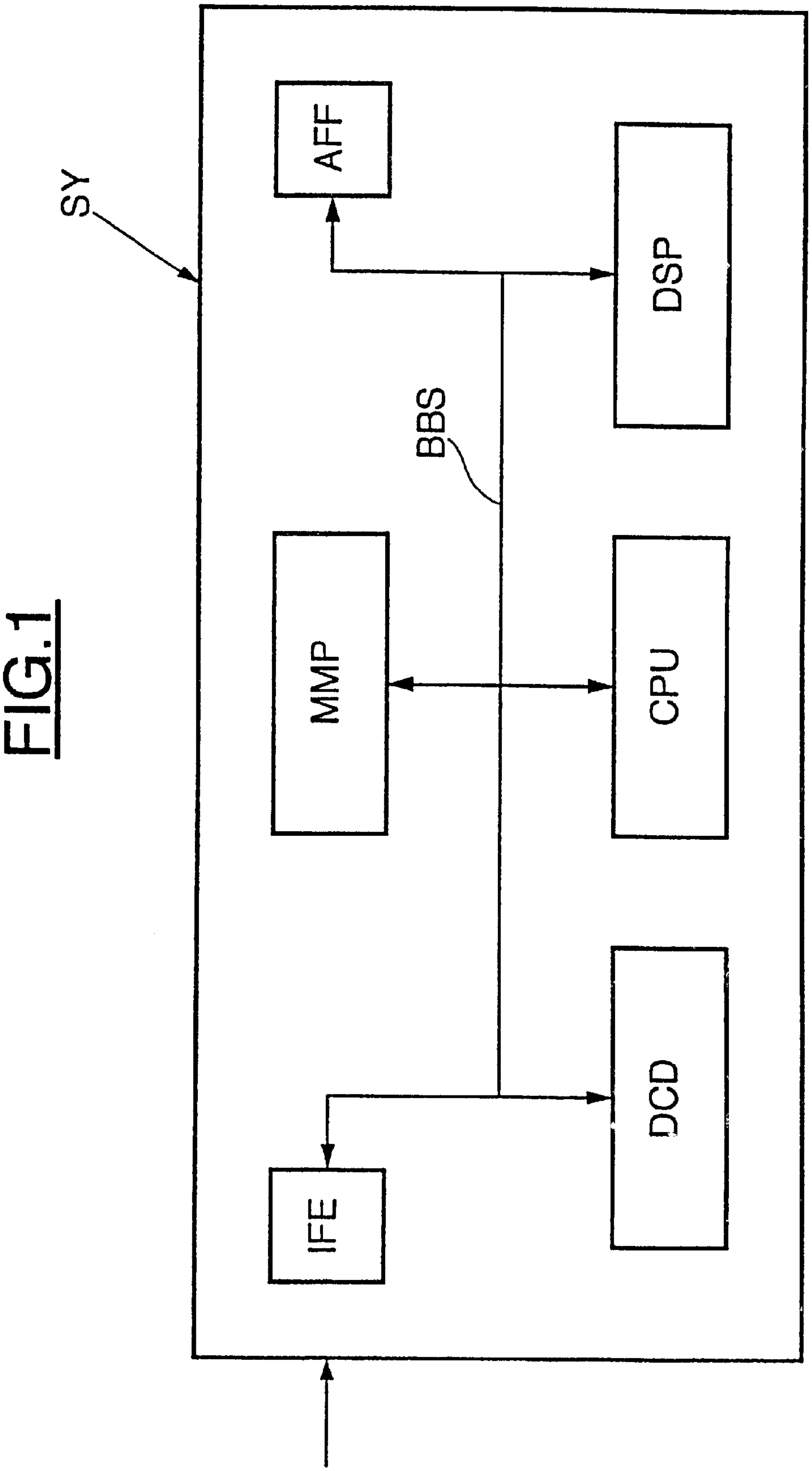
FIG. 1 is a diagrammatic overview of an image forming system according to the invention.

In FIG. 1, the reference SY generally designates a system for forming digital images incorporating for example a satellite decoder and/or a television set. In this system SY, input IFE receives, for example from a DVD, a main stream of data compressed according, for example, to the MPEG standards. The input IFE also receives auxiliary streams comprising sets of graphical data likewise compressed, and corresponding to graphical elements which form auxiliary graphical images intended to be inset into a predetermined area of a display screen AFF superimposed on main images resulting from the decoding of the compressed main data.

To decode the compressed main data, a main decoder DCD, or MPEG decoder, is provided. The system SY further comprises a microprocessor CPU which can, for example, manage the decoding of various satellite channels, as well as an auxiliary decoder DSP (sub-image decoder), which is intended to decode the compressed graphical information corresponding to the auxiliary graphical images. Another element of this system is a dynamic memory MMP, for example an SDRAM memory, which is shared between these various elements. It is particularly beneficial to be able to limit the memory size of this memory to limit its cost and bulk. This is one of the objects of the invention. The set of elements of FIG. 1 communicates via a bidirectional bus BBS.

Figure 2:
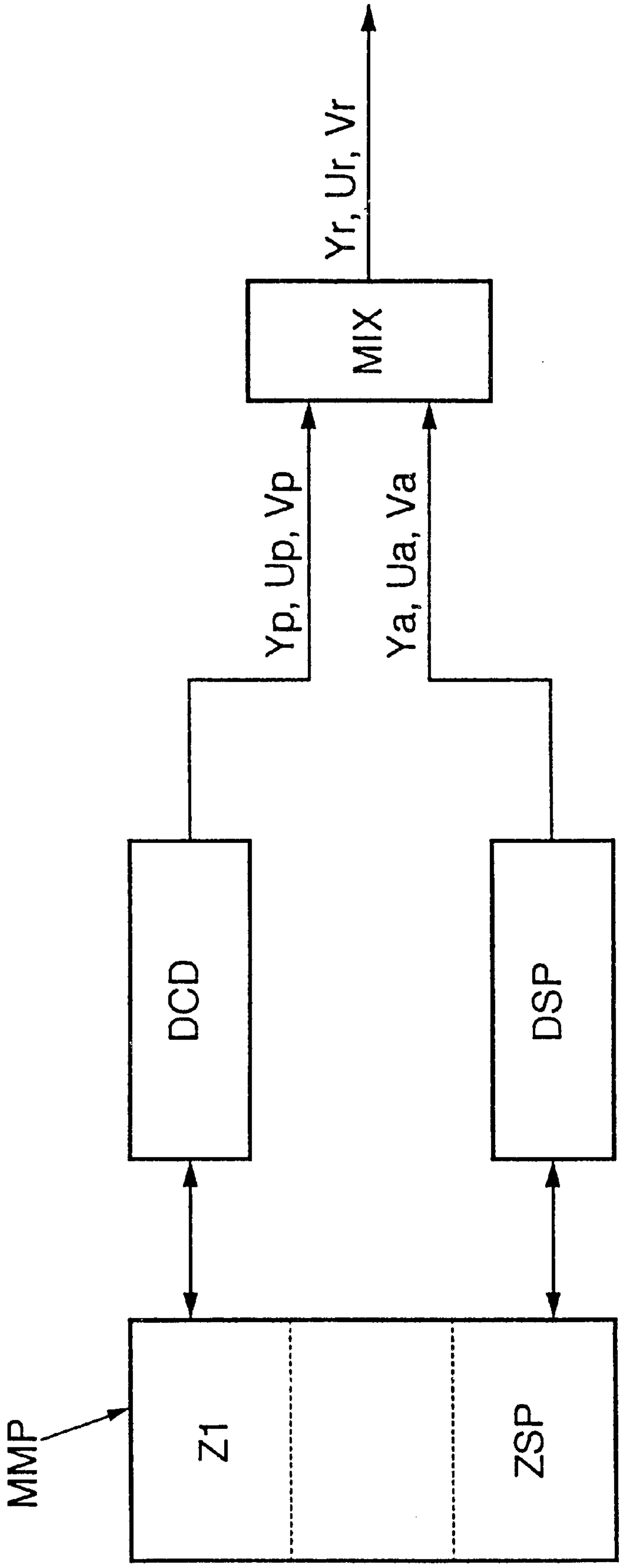
FIG. 2 illustrates a part of the system of FIG. 1.

The memory MMP comprises (FIG. 2) a memory area Z1 for storing the main compressed data awaiting processing, as well as an area ZSP serving to store the auxiliary streams corresponding to the auxiliary graphical images. In fact, the memory MMP also comprises at least two additional memory areas (not represented here for the sake of simplification) and serving to store already-decoded main images.

Operationally, the MPEG decoder DCD outputs, after decoding and/or extraction from the memory MMP, values of luminance Yp and of chrominance Up and Vp, for each of the pixels of the main image to be displayed. Furthermore, as will be discussed in greater detail below, the auxiliary decoder DSP cooperates with the area ZSP of the memory MMP to decode the auxiliary graphical images on the fly, and to provide, at the rate of display of the pixels on the screen, the luminance and chrominance values Ya, Ua, Va, of each pixel of the auxiliary graphical image thus decoded. The chrominance values emanating from the MPEG decoder DCD, and from the auxiliary decoder DSP, are mixed in a mixer MIX, with respect to a mixing coefficient, to generate, for the relevant pixel of the resulting image, luminance and chrominance values Yr, Ur and Vr. It should be noted here that for the sake of simplification, the mixer MIX has not been represented in FIG. 1.

Figure 3:
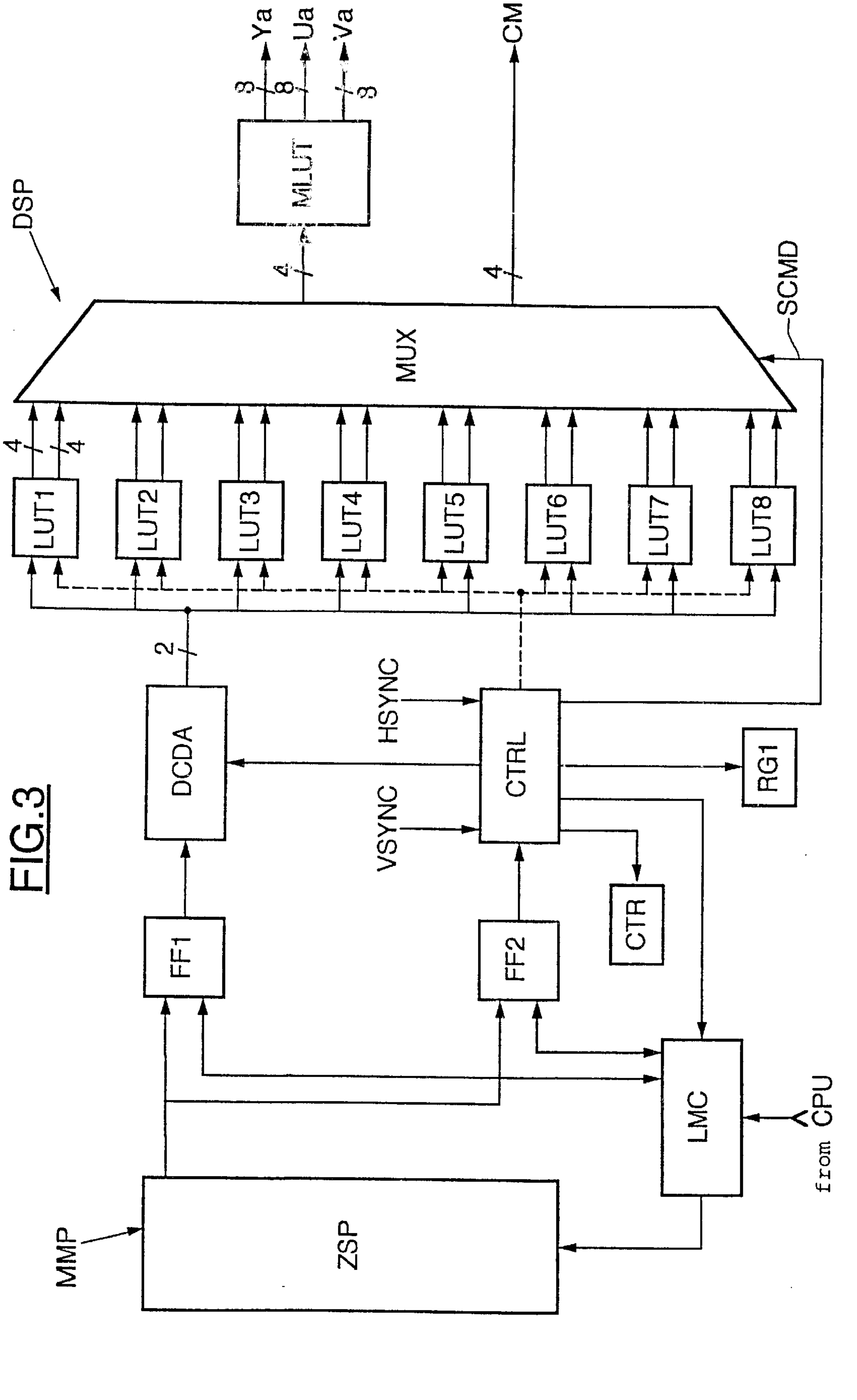
FIG. 3 diagrammatically illustrates the internal architecture of an auxiliary image decoder (sub-image decoder) in greater detail.

More particularly, in FIG. 3, it may be seen that the auxiliary decoder DSP comprises a first FIFO type memory FF1 and a second FIFO type memory FF2 which are capable of receiving data from the auxiliary streams stored in the area ZSP of the memory MMP. Apart from these two memories, the auxiliary decoder is essentially constructed from gates and integrated logic circuits. As will be seen in greater detail below, the memory FF1 is devoted to the storage of the compressed graphical data which forms the auxiliary graphical image or images, while the memory FF2 is more particularly intended for storing the parametrization data DCSQ incorporated within an auxiliary stream and associated with one or more auxiliary graphical images.

The compressed graphical data stored in the memory FF1 are decoded in an auxiliary decoder block DCDA comprising, in particular, a variable-length decoding circuit (VLD) and a zero-run decoding circuit (RLD) which are well known to the person skilled in the art and are conventional in image decoding. Moreover, the auxiliary decoder block DCDA is controlled by a controller CTRL which also receives for analysis and processing purposes, the parametrization data DCSQ stored in the memory FF2. The controller CTRL also cooperates with a temporal counter CTR as well as with a register RG1 which will be discussed in greater detail below. A memory controller LMC communicates with the controller CTRL, as well as with the two memories FF1 and FF2 (by way of requests and acknowledgments), and manages the addressing of the memory MMP. This memory controller LMC is also linked to the external microprocessor CPU.

In the example described here, the auxiliary decoder DSP also comprises eight distinct elementary memories (or eight distinct memory areas of the same memory) referenced LUT1–LUT8 (in practice, other elementary memories making it possible to highlight geometrical shapes, may be provided). These elementary memories are addressed in the example described by two bits delivered by the auxiliary decoder block DCDA and resulting from the decoding of the compressed auxiliary graphical data. Furthermore, during a programming phase, which will be discussed in greater detail below, the controller CTRL can also program, i.e. load, the content of at least some of these elementary memories as a function of the content of the parametrization data stored in the memory FF2.

The controller CTRL also delivers, during the decoding of the compressed graphical data, a control signal SCMD to the multiplexer MUX to select one of the elementary memories LUTi. The data stored in this selected elementary memory is then output from the multiplexer. More precisely, a first part of this data, for example four bits, is delivered to a final memory MLUT containing, at each address designated by the received four bits, luminance and chrominance values Ya, Ua and Va of eight bits and corresponding to a predefined color. Another part of the data delivered by the selected elementary memory LUTi forms a mixing coefficient CM of four bits which will be delivered to the mixer MIX to weight the mixing between the luminance and chrominance values of the pixel of the main image and the luminance and chrominance values of the pixel of the auxiliary graphical image.

Figure 4:
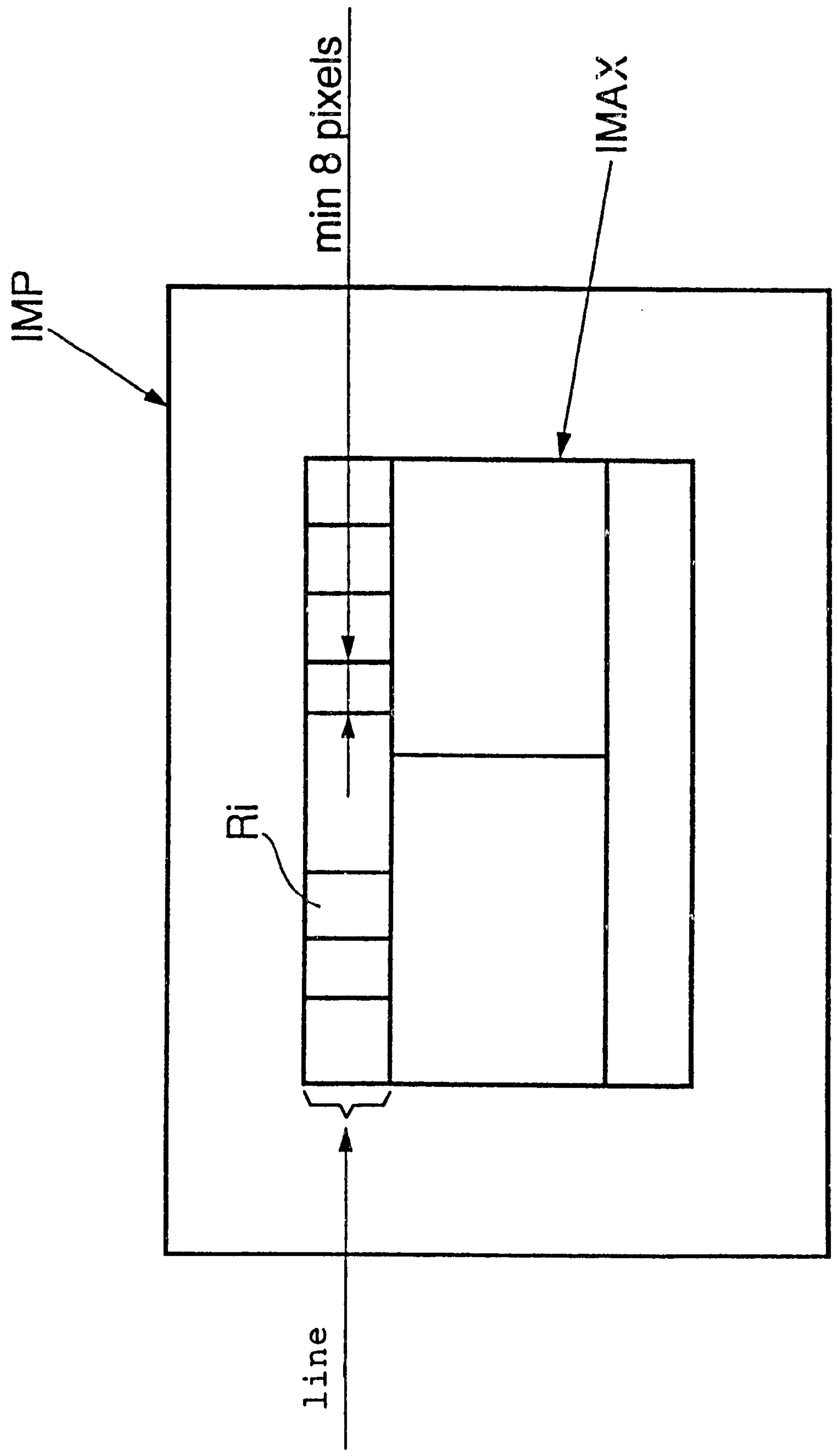
FIG. 4 illustrates the dividing of an auxiliary graphical image intended to be superimposed on a main image, into regions.

A mode of operation of the device according to the invention, as well as an embodiment of the process according to the invention will now be described in greater detail while referring more particularly to FIGS. 4–6. According to a general characteristic of the invention, the compressed data of an auxiliary stream of data defining an auxiliary image is decoded on the fly during the display of each main image into which this auxiliary image is to be inset. Luminance and chrominance values Ya, Ua, Va intended to be mixed with those Yp, Up, Vp of the counterpart pixels of the main image being displayed are then delivered in succession during each decoding of the auxiliary image, for the successive pixels of this auxiliary image.

An auxiliary image IMAX (FIG. 4) is intended to be inset into a predetermined area of the screen, superimposed on the main image IMP. In fact, the elementary memories LUTi each define a look-up table which stores four color/mixing coefficient pairs at most, in the present case, since the addressing of each of these tables is performed on two bits. Each table LUTi is therefore associated with a region of the image within which it will be possible to find at most only four different color/mixing coefficient pairs. Since, in the present case, there are only eight elementary memories LUTi, there can therefore be only eight different possible regions for the auxiliary image IMAX. Of course, each line of the auxiliary image IMAX can be divided into these eight regions. However, certain lines may be divided into fewer than eight regions. Each region Ri may be of a different size, while nevertheless having, in the example described here, a minimum size of eight pixels.

Figure 5:
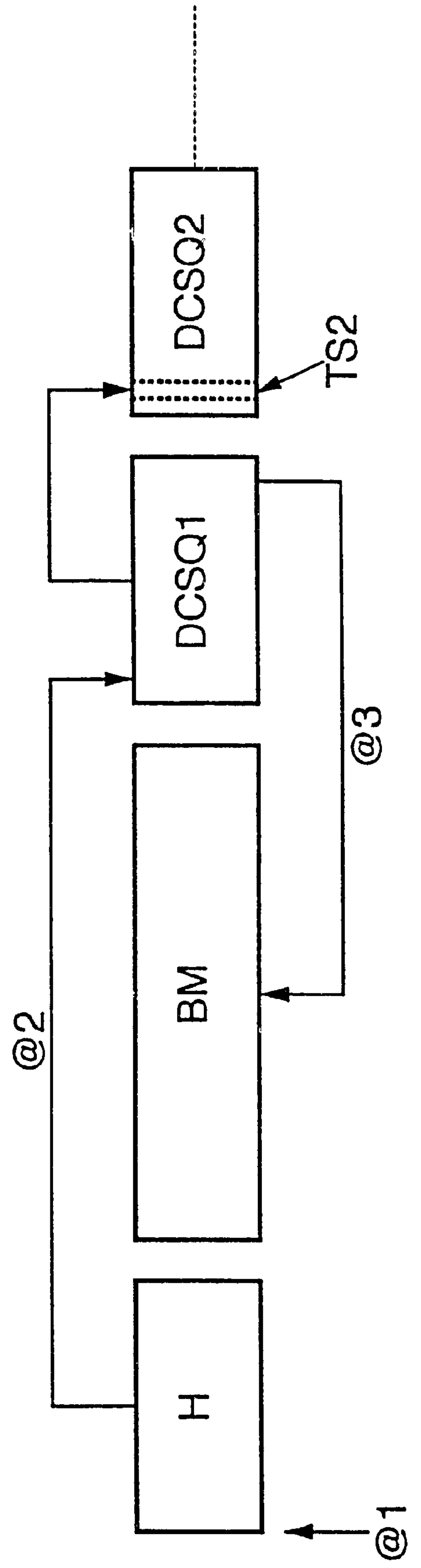
FIG. 5 generally illustrates the architecture of an auxiliary stream corresponding to auxiliary graphical images, as well as an embodiment of the decoding process according to the invention.

It may be seen in FIG. 5 that an auxiliary stream stored in the area ZSP of the memory MMP generally comprises a header H, compressed graphical data BM intended in the present case to form several different auxiliary graphical images, and several packets of parametrization data DCSQ1, DCSQ2 etc. The parametrization data DCSQ1, DCSQ2 being respectively associated with each set of compressed graphical data corresponding to each auxiliary image intended to be displayed on the screen. The header H comprises the address @2 making it possible to locate the start of the packet of parametrization data DCSQ1 of the first auxiliary graphical image, in the memory area ZSP. Furthermore, each packet of parametrization data comprises the binary data relating to the various color/mixing coefficient pairs corresponding to each of the regions of the auxiliary graphical image, as well as the size of these regions line by line. These sizes corresponding to designation data making it possible, as will be discussed in greater detail below, during the decoding of the images, to select a look-up table as a function of the line and of the position of the pixel in the line. Each packet DCSQi also comprises the address @3 corresponding to the start of the compressed graphical data of the auxiliary graphical image corresponding to the packet DCSQi. Lastly, each packet DCSQi contains a temporal indication (TS2 for the packet DSQ2) which indicates the main image to which the auxiliary graphical image corresponding to this packet of parametrization data refers.

Conventionally, an MPEG data train comprises main streams of compressed video data, corresponding to the main images, streams of audio data, and auxiliary streams of graphical data corresponding to the auxiliary graphical images. These streams are transmitted in a multiplexed manner and are each preceded by a temporal presentation identifier PTS. When the temporal identifier PTS of an auxiliary stream corresponding to one or more auxiliary graphical images is detected, the external microprocessor CPU delivers the address @1 to the memory controller LMC, allowing the address pointer to point to the start of the auxiliary stream (FIG. 5).

The header H of the auxiliary stream is then, for example, stored in the memory FF2 and analyzed by the controller CTRL. The controller CTRL detects the address @2 indicating the start of the packet DCSQ1 and supplies this address @2 to the memory controller LMC which points to the corresponding address. The parametrization data contained in the packet DCSQ1 are then stored in the memory FF2 for the purposes of analysis by the controller CTRL. This analysis comprises the programming of at least one of the elementary memories LUTi, i.e. binary data relating to the color/mixing coefficient pairs corresponding to the various regions of the auxiliary graphical image whose decoding will be parametrized by the parametrization data contained in the packet DCSQ1, is stored in these memories. Although, generally, the content of the memory MLUT is effected at the start of a sequence of images, the possibility that its content may also be defined by the parametrization data contained in the packet DCSQ1 cannot be excluded.

Furthermore, before commencing the decoding of the compressed graphical data corresponding to the auxiliary graphical image which will be inset, the control means CTRL will read the temporal indication TS2 of the packet DCSQ2 corresponding to the next graphical image and store this indication in the register RG1. In this regard, during reception of the temporal identifier PTS of the auxiliary stream, the counter CTR has been initialized by the controller CTRL to a predetermined initial value. This initial value may, for example, be the exact time of the occurrence of the first main image into which the first auxiliary graphical image will have to be inset. As a variant, it would also be possible to initialize the counter CTR to the value zero. Additionally, if the exact time is stored in the counter CTR, the temporal indication TS2 stored in the register RG1 may then be the exact time at which the decoding of the next auxiliary graphical image corresponding to the packet DCSQ2 has to commence. If the counter CTR is initialized to the value zero, the temporal indication TS2 stored in the register RG1 may then simply be the duration of the displaying of the current auxiliary graphical image. In this instance the current auxiliary graphical image corresponds to the packet DCSQ1.

Once the operation for analyzing the packet DCSQ1 has been performed (this analysis being performed on the rise of the signal VSYNC during frame flyback), the controller CTRL will read the address @3 contained in the packet DCSQ1 and corresponding to the start address of the compressed graphical data corresponding to the auxiliary graphical image which is to be decoded. On request, the compressed graphical data is then stored in the memory FF1 so as to be decoded on the fly by the auxiliary decoder DCDA. This auxiliary decoder DCDA delivers pairs of bits corresponding to the compressed graphical data, in succession. These pairs of bits are delivered as addresses to the tables LUTi which are selected by the control signal SCMD delivered by the controller CTRL as a function of the content of the parametrization data DCSQ1, and especially of the size of the various regions of the auxiliary graphical image. The four bits corresponding to the color, and delivered by the selected table LUTi, address the memory MLUT which delivers three times eight bits corresponding to the luminance and chrominance values of the relevant pixel of the decoded auxiliary graphical image. In parallel with this, the four bits of the mixing coefficient CM also contained in the selected table LUTi are delivered to the mixer MIX.

In the present case, the luminance and chrominance values Ya, Ua and Va are delivered simultaneously as output from the memory MLUT and are therefore delivered at the pixel display frequency, i.e. about 13.5 MHZ. Of course, if the luminance values, as well as the pair of chrominance values, were delivered sequentially, these would be delivered at a frequency of about 27 MHZ. The luminance and chrominance values thus delivered are mixed in the mixer MIX, with respect to the mixing coefficient, and for each pixel and for each line of the frame of the image displayed.

This decoding operation is continued for all the lines of the frame of the auxiliary graphical image. During the frame flyback, the procedure just described for analyzing the data of the packet DCSQ1 is repeated. Then, during the display of the next frame, the decoding of the second frame of the auxiliary graphical image is performed. These operations are repeated as long as the value of the temporal counter CTR does not become greater than or equal to the value contained in the register RG1. If such is the case, the controller CTRL will then designate the address at which the packet DCSQ2 of parametrization data corresponding to the next graphical image is situated. The same operations as just described for the previous graphical image are repeated for this next auxiliary graphical image.

Figure 6:
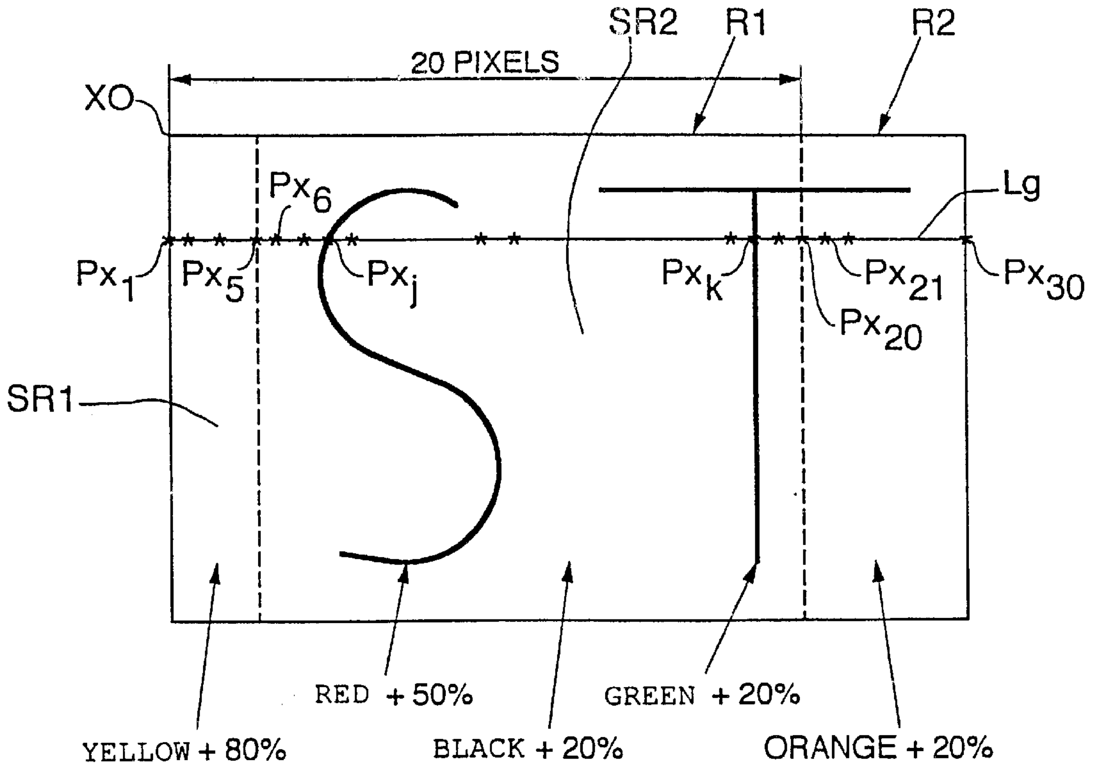
FIG. 6 illustrates, in a particular case, the manner of operation of the sub-image decoder according to the invention as well as an embodiment of the process according to the invention.

Reference is now made to FIG. 6 to more particularly describe the mode of operation of the device, according to the invention, for a particular auxiliary graphical image. This auxiliary graphical image is composed of a rectangle, each line LG of which comprises 30 pixels $PX_1$-$PX_{30}$. The coordinates of the start XO of the image may be defined in the packet DCSQ or else predefined by the microprocessor CPU. A first sub-region SR1 of this graphical image extends between pixels $PX_1$ and $PX_5$ and is composed of a background of yellow color to which a mixing coefficient of 80% is assigned. The second sub-region SR2 extends from pixel $PX_6$ to pixel $PX_{20}$ and is composed of a black background assigned a mixing coefficient of 20%, on which is displayed the letter S, colored red, with a mixing coefficient of 50% and a part of the letter T, colored green, with a mixing coefficient of 20%.

A first region Ri with a size of 20 pixels, and formed by the sub-regions SR1 and SR2, can therefore be defined in this auxiliary graphical image (for all its lines and for all its frames). This first region can be assigned to the table LUT1 in which are stored the pair (black; 20%) at the address 00, the pair (green; 20%) at the address 01, the pair (yellow; 80%) at the address 10 and the pair (red; 50%) at the address 11. Of course, all these pairs are, as indicated above, each represented by 2 words of 4 bits, the first word of 4 bits forming an address for the memory MLUT. The second region of the image which extends from pixel $PX_{21}$ to pixel $PX_{30}$ is composed of an orange background assigned a mixing coefficient of 20%, on which is written the remainder of the bar of the T colored green +20%. This second region R2 can therefore be assigned the table LUT2, in which are stored the pair (orange; 20%) at the address 00 and the pair (green; 20%) at the address 01. Lastly, it is assumed that this image is to be displayed for 30 minutes starting from the occurrence of an initial main image.

Additionally, between each frame flyback, the controller CTRL will load the tables LUT1 and LUT2 with the binary values corresponding to the pairs indicated in FIG. 6. Furthermore, by comparing the contents of the temporal counter CTR and of the register RG1 the controller CTRL determines whether the duration of 30 minutes has expired.

The compressed graphical data stored in the memory FF1 are such that, after decoding in the auxiliary decoder block DCDA, the binary data associated with pixels $PX_1$–$PX_5$ of the line LG (for example) take the value 10. The binary data associated with the data pixels $PX_6$ to $PX_{20}$ all take, after decoding, the value 00, except for those of pixels $PX_j$ and $PX_k$ which take the values 11 and 01 respectively. Regarding the display of pixels 1 to 20, it is therefore the table LUT1 which is selected by the control signal SCMD, and the memory MLUT delivering the right values of color respectively corresponding to the various pixels of the decoded auxiliary graphical image.

After pixel 21, the control signal SCMD will act on the multiplexer so as to select the table LUT2. The binary data of pixels 21 to 30 of the line LG will then all have, after decoding, the value 00.

That which is claimed is:

1. A method of displaying at least one auxiliary image in at least one main image to be displayed, the method comprising the steps of:

decoding compressed data, of an auxiliary stream of data defining the at least one auxiliary image, on the fly during display of the at least one main image on which the at least one auxiliary image is to be inset; and generating, during the decoding of the at least one auxiliary image and for successive pixels of the at least one auxiliary image, luminance and chrominance values to be mixed with luminance and chrominance values of counterpart pixels of the at least one main image being displayed.

2. A method according to claim 1, wherein the at least one main image to be displayed comprises sucessive rain images to be displayed, and further comprising the steps of:

receiving an auxiliary data stream, comprising a set of compressed graphical data corresponding to graphical elements which form the at least one auxiliary image, after an an initial main image and for a predetermined duration;

storing the auxiliary data stream in a memory;

successively decoding the compressed graphical data during a display of the successive main images, from a display of the initial main image up to an expiration of the predetermined duration;

generating, during each decoding, at a rate of display of the pixels and for each pixel of the at least one auxiliary image, the luminance and chrominance values and a mixing coefficient; and mixing the chrominance and luminance values corresponding to the main image being displayed and to the decoded at least one auxiliary image, pixel-by-pixel, in a predetermined screen area of a display, and with respect to the respective mixing coefficient.

3. A method according to claim 2, wherein the auxiliary data stream further comprises a header and at least one set of parameter data for parametrization of the decoding of the auxiliary image, and further comprising the steps of:

decoding each of the successive main images line-by-line and in two successive frames corresponding to lines of different parities; and analyzing the at least one set of parameter data between a display of each frame.

4. A method according to claim 3, wherein the at least one auxiliary image comprises successive auxiliary images each to be superimposed in succession with the successive main images for a respective duration, and wherein the at least one set of parameter data comprises multiple sets of parameter data each for parametrization of the decoding of an auxiliary image, and further comprising the steps of:

determining whether the predetermined duration corresponding to an auxiliary image has expired;

analyzing the set of parameter data corresponding to the auxiliary image between a display of each frame;

decoding the compressed graphical data of the auxiliary image on the basis of the set of parameter data; and analyzing a next set of parameter data corresponding to a next auxiliary image when the corresponding predetermined duration has expired, and then decoding the compressed graphical data of the next auxiliary image on the basis of the next parameter data.

5. A method according to claim 4, further comprising the steps of:

initializing a temporal counter to a predetermined initial value when receiving the auxiliary stream, wherein each set of parameter data comprises a temporal indication linked to the predetermined initial value, and representative of a start of a first decoding of the corresponding auxiliary image;

storing the temporal indication of the next auxiliary image in a memory before decoding a first auxiliary image and then successively decoding the compressed graphical data of the auxiliary images;

parametrizing the decodings by the corresponding set of parameter data as long as the value of the temporal counter is less than the content of the memory.

6. A method according to claim 3, wherein the at least one set of parameter data comprises memory designation data and the step of analyzing the at least one set of parameter data comprises storing different groups of color/mixing coefficient pairs in different respective memories, the number of pairs per group being less than a first predetermined number, the number of groups being less than or equal to a second predetermined number, and wherein the line-by-line decoding of each auxiliary image comprises successive addressing, via the decoded graphical data, of respective memories designated in succession by the designation data.

7. A method of displaying at least one auxiliary image inset on at least one main image to be displayed, the method comprising the steps of:

decoding auxiliary image data on the fly during display of the at least one main image on which the at least one auxiliary image is to be inset; and generating chrominance and luminance pixel values of the at least one auxiliary image, to be mixed with chrominance and luminance pixel values of the at least one main image to be displayed.

8. A method according to claim 7, wherein the chrominance and luminance pixel values of the at least one auxiliary image are generated during the decoding of the at least one auxiliary image.

9. A method of displaying at least one auxiliary image inset on sucessive main images to be displayed, the method comprising the steps of:

receiving auxiliary image data for a predetermined duration from the receipt of an an initial main image;

storing the auxiliary image data; and successively decoding the auxiliary image data on the fly during a display of the successive main images on which the at least one auxiliary image is to be inset.

10. A method according to claim 9, wherein the auxiliary image data is successively decoded from a display of the initial main image until an expiration of the predetermined duration.

11. A method according to claim 9, further comprising the steps of:

generating chrominance and luminance pixel values and a mixing coefficient for the at least one auxiliary image; and mixing chrominance and luminance pixel values of a main image being displayed with chrominance and luminance pixel values of the at least one auxiliary image, pixel-by-pixel, and with respect to the mixing coefficient.

12. A method according to claim 9, wherein the auxiliary image data comprises at least one set of parameter data, and further comprising the step of analyzing the at least one set of parameter data for the decoding of the auxiliary image data.

13. A method according to claim 12, wherein the at least one auxiliary image comprises successive auxiliary images each to be superimposed in succession with the successive main images for a respective duration, and wherein the at least one set of parameter data comprises multiple sets of parameter data, and further comprising the steps of:

analyzing the set of parameter data corresponding to the auxiliary image, and decoding the auxiliary image data of the auxiliary image on the basis of the set of parameter data, when the predetermined duration corresponding to an auxiliary image has not expired; and analyzing a next set of parameter data corresponding to a next auxiliary image and then decoding the auxiliary image data of the next auxiliary image on the basis of the next parameter data, when the corresponding predetermined duration has expired.

14. A method according to claim 13, further comprising the steps of:

initializing a counter to a predetermined initial value when receiving the auxiliary image data, wherein each set of parameter data comprises a temporal indication linked to the predetermined initial value, and representative of a start of a first decoding of the corresponding auxiliary image;

storing the temporal indication of the next auxiliary image in a memory before decoding a first auxiliary image and then successively decoding the auxiliary image data; and parametrizing the decoding of the auxiliary image data by the corresponding set of parameter data as long as the value of the counter is less than the content of the memory.

15. A method according to claim 12, wherein the at least one set of parameter data comprises memory designation data and the step of analyzing the at least one set of parameter data comprises storing different groups of color/mixing coefficient pairs in respective memories, and wherein the decoding of each auxiliary image comprises successive addressing, via decoded graphical data of the auxiliary image, of respective memories designated in succession by the designation data.

16. A device for processing a main stream including main image compressed data and at least one auxiliary stream including at least one set of compressed graphical data corresponding to graphical elements which form at least one auxiliary image to be inset into a predetermined display area and superimposed on successive main images after an initial main image and for a predetermined duration, and for displaying the at least one auxiliary image inset on at least one main image to be displayed, the device comprising:

a receiver for receiving the main stream and the auxiliary stream;

a memory for storing the main stream and the auxiliary stream;

a main decoder for decoding the main image compressed data and for generating luminance and chrominance values for each pixel of a decoded main image;

an auxiliary decoder for successively decoding the at least one set of compressed graphical data during the display of the successive main images, from the display of the initial main image to an expiration of the predetermined duration, and for generating chrominance and luminance values as well as a mixing coefficient for each pixel of the at least one auxiliary image during each decoding and at a rate of display of the pixels; and a mixer for mixing, pixel-by-pixel in the predetermined display area, the chrominance and luminance values of the decoded main image with the chrominance and luminance values of the decoded auxiliary image and with respect to the mixing coefficients.

17. A device according to claim 16, wherein the auxiliary stream further comprises a header and at least one set of parameter data for parametrizing the decoding of the at least one auxiliary image; wherein the auxiliary decoder comprises a first FIFO memory for storing the compressed graphical data and a second FIFO memory for storing the parameter data; wherein the main decoder is for decoding each of the successive main images line-by-line and in two successive frames corresponding to lines of different parities; and wherein the auxiliary decoder comprises an analyzer for delivering the parameter data to the second FIFO memory and for analyzing the at least one set of parameter data between a display of each frame, and a processor for decoding the compressed graphical data stored in the first memory, on the basis of the parameter data, and for delivering to the mixer, for each pixel of the auxiliary image, the chrominance and luminance values, and the mixing coefficient.

18. A device according to claim 17, wherein the at least one auxiliary image comprises several successive auxiliary images to be superimposed in succession on the main images for a respective predetermined duration; wherein the auxiliary stream comprises several sets of parameter data each for parametrizing the decoding of an auxiliary image; wherein the analyzer is for delivering the corresponding parameter data to the second FIFO memory between each display of a frame, and for analyzing the parameter data as long as the predetermined duration corresponding to an auxiliary image has not expired, and for delivering a next set of parameter data of a next auxiliary image to the second FIFO memory, between each display of a frame, and for analyzing the next set of parameter data, when the corresponding predetermined duration has expired, and wherein the processor is for decoding the compressed graphical data stored in the first FIFO memory and corresponding to the next auxiliary image, on the basis of the next parameter data.

19. A device according to claim 18, wherein the analyzer comprises a counter and a controller for initializing the counter to a predetermined initial value; wherein each set of parameter data comprises a temporal indication linked to the predetermined initial value and representative of the start of a first decoding of the corresponding auxiliary image; wherein the analyzer comprises a register for storing the temporal indication of the next auxiliary image; and wherein the processor is for decoding the current auxiliary image parametrized by the corresponding set of parameter data as long as the value of the counter is less than the temporal indication stored in the register.

20. A device according to claim 17, wherein the auxiliary decoder comprises:

a plurality of memories for respectively storing different groups of color/mixing coefficient pairs, the number of pairs per group being less than a first predetermined number, the number of elementary memories being less than or equal to a second predetermined number;

a multiplexer including inputs connected to outputs of the memories; and a controller for controlling the multiplexer and for selecting the inputs of the multiplexer as a function of designation data contained in the at least one set of parameter data;

wherein the processor is for addressing the memories via the decoded graphical data.

21. A device for processing main image data of main images and at least one set of auxiliary image data of at least one auxiliary image to be superimposed on successive main images for a predetermined duration from a display of an initial main image, and for displaying the at least one auxiliary image superimposed on successive main images to be displayed, the device comprising:

a main decoder for decoding the main image data and for generating luminance and chrominance pixel values for each decoded main image;

an auxiliary decoder for successively decoding the at least one set of auxiliary image data on the fly and during a display of the successive main images, and for generating chrominance and luminance pixel values as well as a mixing coefficient for the at least one auxiliary image; and a mixer for mixing the chrominance and luminance pixel values of a decoded main image with the chrominance and luminance values of the decoded auxiliary image and with respect to the mixing coefficients.

22. A device according to claim 21, further comprising:

a receiver for receiving the main image data and the auxiliary image data; and a memory for storing the main image data and the auxiliary image data.

23. A device according to claim 21, wherein the auxiliary decoder is for successively decoding the at least one set of auxiliary image data from a display of the initial main image until an expiration of the predetermined duration.

24. A device according to claim 21, wherein the auxiliary image data comprises at least one set of parameter data, and wherein the auxiliary decoder comprises:

a first memory for storing the auxiliary image data;

a second memory for storing the at least one set of parameter data;

an analyzer for delivering the at least one set of parameter data to the second memory and for analyzing the at least one set of parameter data; and a processor for decoding the auxiliary image data stored in the first memory, on the basis of the at least one set of parameter data, and for delivering to the mixer, the chrominance and luminance pixel values and the mixing coefficient.

25. A device according to claim 24, wherein the at least one auxiliary image comprises several successive auxiliary images to be superimposed in succession on the main images for a respective predetermined duration; wherein the auxiliary image data comprises several sets of parameter data; wherein the analyzer is for delivering the corresponding parameter data to the second memory and for analyzing the parameter data as long as the predetermined duration corresponding to an auxiliary image has not expired, and for delivering a next set of parameter data of a next auxiliary image to the second memory and for analyzing the next set of parameter data, when the corresponding predetermined duration has expired; and wherein the processor is for decoding the auxiliary image data stored in the first memory and corresponding to the next auxiliary image, on the basis of the next parameter data.

26. A device according to claim 25, wherein the analyzer comprises a counter and a controller for initializing the counter to a predetermined initial value; wherein each set of parameter data comprises a temporal indication linked to the predetermined initial value and representative of the start of a first decoding of the corresponding auxiliary image; wherein the analyzer comprises a register for storing the temporal indication of the next auxiliary image; and wherein the processor is for decoding the current auxiliary image parametrized by the corresponding set of parameter data as long as the value of the counter is less than the temporal indication stored in the register.

27. A device according to claim 24, wherein the auxiliary decoder comprises:

a plurality of memories for respectively storing different groups of color/mixing coefficient pairs;

a multiplexer including inputs connected to outputs of the memories; and a controller for controlling the multiplexer and for selecting the inputs of the multiplexer as a function of designation data contained in the at least one set of parameter data;

wherein the processor is for addressing the memories via the decoded graphical data.

* * * * *